United States Patent
Okumura

(10) Patent No.: US 9,528,838 B2
(45) Date of Patent: Dec. 27, 2016

(54) AUTONOMOUS VEHICLE DETECTION OF AND RESPONSE TO INTERSECTION PRIORITY

(71) Applicant: Toyota Motor Engineering & Manufacturing North America, Inc., Erlanger, KY (US)

(72) Inventor: Bunyo Okumura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/565,278

(22) Filed: Dec. 9, 2014

(65) Prior Publication Data

US 2016/0161271 A1 Jun. 9, 2016

(51) Int. Cl.
*G01C 22/00* (2006.01)
*G01C 21/34* (2006.01)
*B60W 30/18* (2012.01)
*G05D 1/02* (2006.01)

(52) U.S. Cl.
CPC ............ *G01C 21/34* (2013.01); *B60W 30/181* (2013.01); *G05D 1/0276* (2013.01); *G05D 2201/0213* (2013.01)

(58) Field of Classification Search
CPC .................. G01C 21/34; G05D 1/0276; G05D 2201/0213; B60W 30/181
USPC .......................................................... 701/25
See application file for complete search history.

(56) References Cited

U.S. PATENT DOCUMENTS

| | | | | |
|---|---|---|---|---|
| 7,663,505 B2* | 2/2010 | Publicover | ............. | G08G 1/095 340/907 |
| 8,027,762 B2* | 9/2011 | Otake | ...................... | B60T 7/22 701/117 |
| 8,031,062 B2* | 10/2011 | Smith | .................... | G08G 1/166 340/438 |
| 8,532,862 B2* | 9/2013 | Neff | ..................... | G05D 1/0255 180/167 |

(Continued)

FOREIGN PATENT DOCUMENTS

JP 2014010809 A 1/2014

OTHER PUBLICATIONS

Ali et al.; "Path Navigation for Mobile Robot in a Road Roundabout Setting"; Latest Advances in Systems Science and Computational Intelligence; 2012; pp. 198-203; vol. 6, Issue 4.

(Continued)

*Primary Examiner* — Hussein A. Elchanti
(74) *Attorney, Agent, or Firm* — Christopher G. Darrow; Darrow Mustafa PC

(57) ABSTRACT

An automated driving system and methods are disclosed. The automated driving system includes a perception system disposed on an autonomous vehicle. The automated driving system can detect, using the perception system, a neighboring vehicle proximate to an intersection, identify two or more potential paths through the intersection for the neighboring vehicle, determine a path priority for each of the two or more potential paths, and determine a path priority for a planned path through the intersection for the autonomous vehicle. If the path priority of at least one of the potential paths is higher than the path priority of the planned path, the automated driving system can send a command to one or more vehicle systems configured to allow the neighboring vehicle to proceed through the intersection before the autonomous vehicle.

20 Claims, 4 Drawing Sheets

(56) References Cited

U.S. PATENT DOCUMENTS

| | | | |
|---|---|---|---|
| 8,761,991 B1 | 6/2014 | Ferguson et al. | |
| 2009/0174540 A1* | 7/2009 | Smith | B60Q 1/34 340/465 |
| 2013/0018572 A1* | 1/2013 | Jang | G08G 1/164 701/119 |
| 2013/0304279 A1* | 11/2013 | Mudalige | G08G 1/164 701/2 |
| 2014/0278029 A1* | 9/2014 | Tonguz | G08G 1/087 701/117 |

OTHER PUBLICATIONS

Qian et al.; "Priority-based coordination of autonomous and legacy vehicles at intersection"; 2014 IEEE 17th International Conference; Aug. 29, 2014; in 6 pages.

Perez et al.; "Autonomous driving manoeuvres in urban road traffic environment: a study on roundabouts"; Proceedings of the 18th World Congress of the International Federation of Automatic Control; Aug. 28-Sep. 2, 2011; pp. 13795-13800; Milano, Italy.

Azimi et al.; "V2V-Intersection Management at Roundabouts"; SAE Int. J. Passeng. Cars; Aug. 4, 2013; pp. 681-690; vol. 6, Issue 2.

Alonso et al., "Autonomous vehicle control systems for safe crossroads", Elsevier, Transportation Research Part C 19, 2011, pp. 1095-1110 (16 pages).

Milanes et al., "Controller for Urban Intersections Based on Wireless Communications and Fuzzy Logic", IEEE Transactions on Intelligent Transportation Systems, Institute of Electrical and Electronics Engineers, 2010, pp. 242-248, vol. 11, No. 1 (7 pages).

PCT International Search Report and Written Opinion for International Application No. PCT/US2015/062673, mailed Feb. 26, 2016 (13 pages).

\* cited by examiner

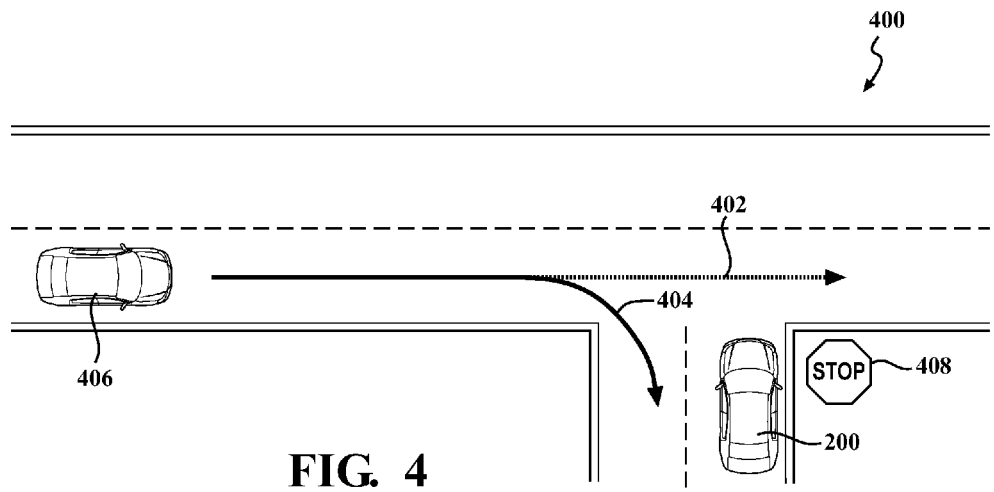
FIG. 4
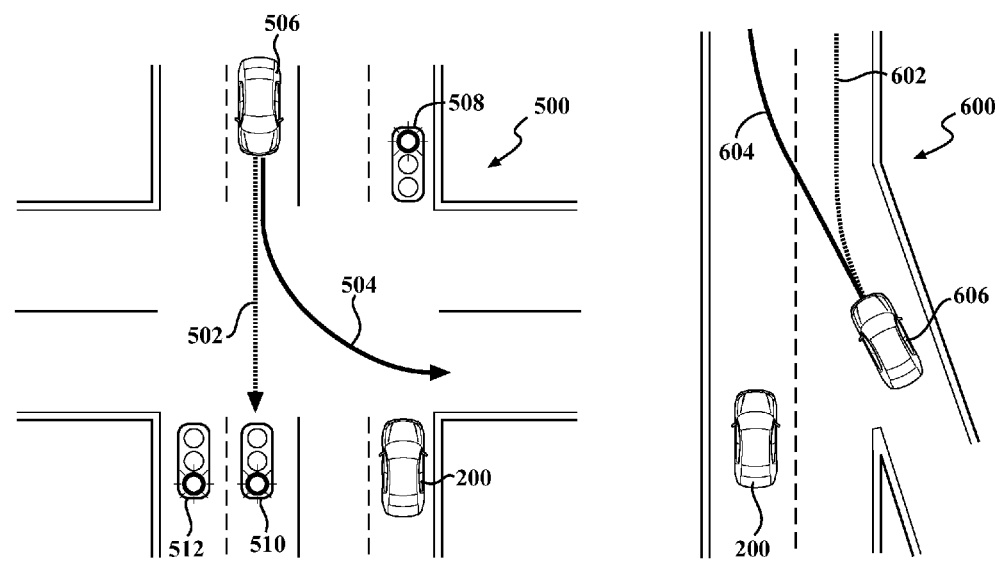
FIG. 5
FIG. 6

AUTONOMOUS VEHICLE DETECTION OF AND RESPONSE TO INTERSECTION PRIORITY

BACKGROUND

Fully or highly automated driving systems are designed to operate a vehicle on the road without driver interaction or other external control, for example, self-driving vehicles or autonomous vehicles. An autonomous vehicle is thus configured to traverse a planned path between its current position and a target future position without input from the driver. Nearby, or neighboring, vehicles can travel along paths that can intersect with the planned path of the autonomous vehicle. This is especially true when the autonomous vehicle approaches an intersection.

Prior art driving systems include means for dynamically generating trajectories to navigate an intersection and for sectioning an intersection into a grid of segments to determine when vehicles should occupy specific segments of the intersection; but to operate safely and efficiently at an intersection, the autonomous vehicle should be configured to identify potential paths through the intersection for one or more neighboring vehicles and compare the priority of its own planned path to these potential paths, i.e. determine its right of way, before entering the intersection.

SUMMARY

Methods and systems for automated driving in the presence of neighboring vehicles at an intersection are described below. An autonomous vehicle can use its perception system to detect distance, position, orientation, speed, and acceleration or deceleration for a neighboring vehicle at an intersection. Based on at least some of these parameters, the structure of the intersection, and/or traffic rules for the intersection, potential travel paths for the neighboring vehicle can be identified. Path priorities can also be assigned to the potential paths of the neighboring vehicle and the planned path for the autonomous vehicle. If any of the potential paths have a higher path priority than the path priority for the planned path, the autonomous vehicle can be configured to yield to the neighboring vehicle at the intersection. Alternatively, if the planned path has a higher priority than all of the potential paths, the autonomous vehicle can proceed through the intersection before the neighboring vehicle.

In one implementation, an automated driving system is disclosed. The automated driving system includes a perception system disposed on an autonomous vehicle and a computing device in communication with the perception system. The computing device includes one or more processors for controlling operations of the computing device and a memory for storing data and program instructions used by the one or more processors. The one or more processors are configured to execute instructions stored in the memory to: detect, using the perception system, a neighboring vehicle proximate to an intersection; identify two or more potential paths through the intersection for the neighboring vehicle; determine a path priority for each of the two or more potential paths based on at least one of a position and an orientation of the neighboring vehicle; determine a path priority for a planned path through the intersection for the autonomous vehicle; and if the path priority of at least one of the potential paths is higher than the path priority of the planned path, send a command to one or more vehicle systems configured to allow the neighboring vehicle to proceed through the intersection before the autonomous vehicle.

In another implementation, a computer-implemented method of automated driving is disclosed. The method includes detecting, using a perception system disposed on an autonomous vehicle, a neighboring vehicle proximate to an intersection; identifying two or more potential paths through the intersection for the neighboring vehicle; determining a path priority for each of the two or more potential paths based on at least one of a position and an orientation of the neighboring vehicle; determining a path priority for a planned path through the intersection for the autonomous vehicle; and if the path priority of at least one of the potential paths is higher than the path priority of the planned path, sending a command to one or more vehicle systems configured to allow the neighboring vehicle to proceed through the intersection before the autonomous vehicle.

In another implementation, a computing device is disclosed. The computing device includes one or more processors for controlling operations of the computing device and a memory for storing data and program instructions used by the one or more processors. The one or more processors are configured to execute instructions stored in the memory to: detect, using a perception system disposed on an autonomous vehicle, a neighboring vehicle proximate to an intersection; determine a path priority for two or more potential paths through the intersection for the neighboring vehicle; determine a path priority for a planned path through the intersection for the autonomous vehicle; and if the path priority of at least one of the potential paths is higher than the path priority of the planned path, send a command to one or more vehicle systems configured to allow the neighboring vehicle to proceed through the intersection before the autonomous vehicle.

BRIEF DESCRIPTION OF THE DRAWINGS

The description herein makes reference to the accompanying drawings wherein like reference numerals refer to like parts throughout the several views, and wherein:

FIG. 4 shows a t-shaped intersection including a plurality of potential paths for another neighboring vehicle proximate to the autonomous vehicle of FIG. 2;

FIG. 5 shows a cross-shaped intersection including a plurality of potential paths for another neighboring vehicle proximate to the autonomous vehicle of FIG. 2;

FIG. 6 shows a merging intersection including a plurality of potential paths for another neighboring vehicle proximate to the autonomous vehicle of FIG. 2.

DETAILED DESCRIPTION

An automated driving system for an autonomous vehicle is disclosed. The automated driving system includes a perception system with various sensors configured to capture images or other visual representations of the environment surrounding the autonomous vehicle. The automated driving system is configured to detect a neighboring vehicle proximate to an intersection and identify two or more potential paths through the intersection for the neighboring vehicle. The automated driving system can also determine a path priority for each of the two or more potential paths of the neighboring vehicle and for a planned path through the intersection for the autonomous vehicle.

The path priorities can be based on traffic rules for the intersection, the position and orientation of the neighboring vehicle in respect to the autonomous vehicle and/or the potentials paths, and/or status information for the neighboring vehicle such as neighboring vehicle velocity and whether the neighboring vehicle is accelerating or decelerating. If the path priority of at least one of the potential paths is higher than the path priority of the planned path, the automated driving system can allow the neighboring vehicle to proceed through the intersection before the autonomous vehicle. If the path priority of the planned path is higher than the path priorities of all of the potential paths, the automated driving system can send the autonomous vehicle into the intersection in advance of the neighboring vehicle.

Figure 1:
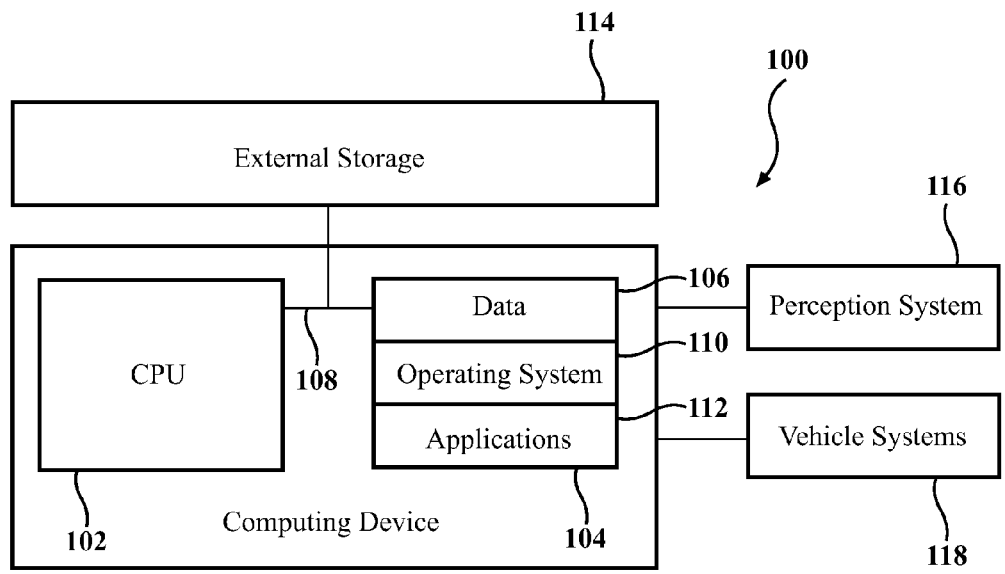
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can be configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle. Information specific to the environment surrounding a vehicle can include information specific to objects such as neighboring vehicles proximate to a planned vehicle path of the autonomous vehicle or any other localized position data and/or signals that can be captured and sent to the CPU 102.

In the examples described below, the perception system 116 can be configured to capture, at least, images for an image-based sensor system such that the computing device 100 can detect the presence of, position of, and orientation of neighboring vehicles within the images. The computing device 100 can also be in communication with one or more vehicle systems 118, such as a vehicle braking system, a vehicle propulsion system, a vehicle steering system, etc. The vehicle systems 118 can also be in communication with the perception system 116, the perception system 116 being configured to capture data indicative of performance of the various vehicle systems 118.

Figure 2:
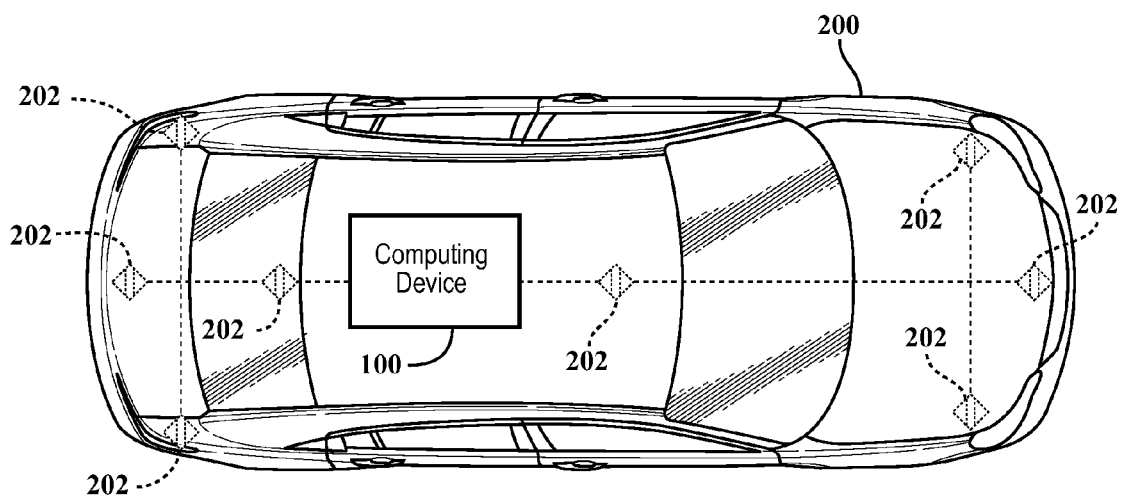
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, the sensors 202 being part of the perception system 116 described in reference to FIG. 1. One or more of the sensors 202 shown can be configured to capture images for processing by an image sensor, vehicle position in global coordinates based on signals from a plurality of satellites, the distance to objects within the surrounding environment for use by the computing device 100 to estimate position and orientation of the autonomous vehicle 200 and the objects such as neighboring vehicles within the surrounding environment, or any other data and/or signals that could be used to determine the current state of the autonomous vehicle 200 or determine the current state of the surrounding environment including the presence of, position of, and orientation of neighboring vehicles in reference to an intersection.

Figure 3A:
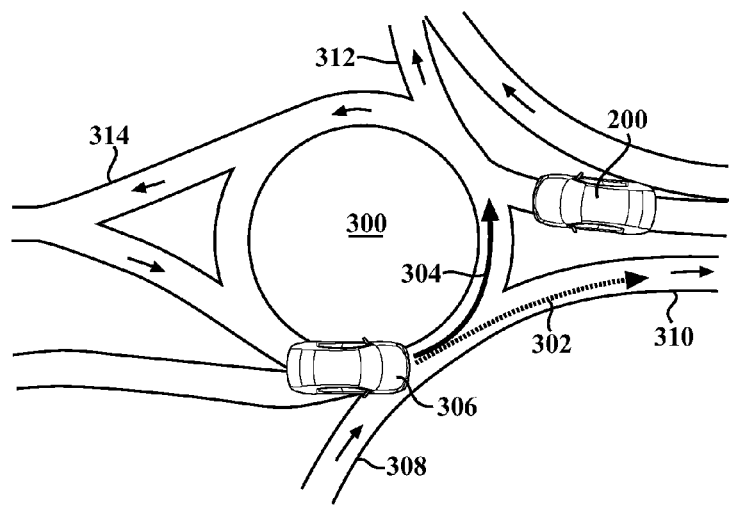
FIGS. 3A-C show a roundabout including a plurality of potential paths for a neighboring vehicle proximate to the autonomous vehicle of FIG. 2.
Figure 3B:
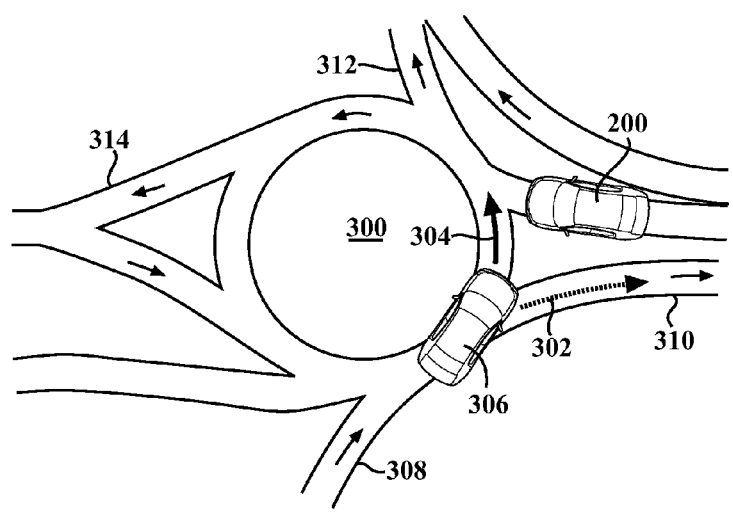
Figure 3C:
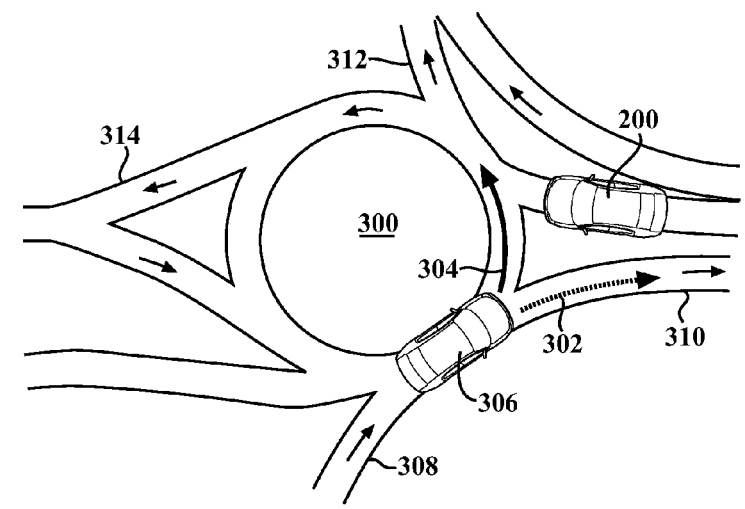

FIGS. 3A-C show a roundabout 300 including a plurality of potential paths 302, 304 for a neighboring vehicle 306 proximate to the autonomous vehicle 200 of FIG. 2. The autonomous vehicle 200 can first recognize that the roundabout 300, a type of intersection, is present along the planned vehicle path for the autonomous vehicle 200. Information related to the roundabout 300, such as the position of exits and entrances, the curvature of the lanes, etc., can be recognized using image-based sensors 202 as part of the perception system 116 or using map-based information present within the memory 104 of the computing device or accessible to the computing device 100 at a remote location. Once the autonomous vehicle 200 is sufficiently proximate to the roundabout 300, the neighboring vehicle 306 can be recognized using, for example, image-based or LIDAR sensors 202 disposed on the autonomous vehicle 200.

FIG. 3A shows that the neighboring vehicle 306 is currently within the roundabout 300 at a position proximate to entrance branch 308 that allows for two potential paths 302, 304. All potential paths 302, 304 are identified for the neighboring vehicle 306 since prediction of which potential path 302, 304 will be followed is not always possible at the time when the neighboring vehicle 306 is first identified, as is the case in FIG. 3A. The potential path 302 indicates that the neighboring vehicle 306 could leave the roundabout 300 at exit branch 310. The potential path 304 indicates that the neighboring vehicle 306 could stay in the roundabout 300 and pass the autonomous vehicle 200, exiting, for example, at either of exit branches 312 and 314. If the neighboring vehicle 306 were to proceed along the potential path 302, the autonomous vehicle 200 would be free to enter the roundabout 300 ahead of the neighboring vehicle 306. However, if the neighboring vehicle 306 were to proceed along the potential path 304, the autonomous vehicle 200 would need to wait for the neighboring vehicle 306 to pass before entering the roundabout 300.

The autonomous vehicle 200 can use the perception system 116 to collect information about the neighboring vehicle 306 such as its size within an image (to determine distance), its position, its orientation in respect to the road or the autonomous vehicle 200, or its velocity, acceleration, yaw rate, etc. to assist in assigning a priority level to each of the potential paths 302, 304 of the neighboring vehicle 306. Priority can be based, for example, on whether the neighboring vehicle 306 is physically able, given its position and the structure of the intersection, to follow the potential path 302, 304. Priority can also be based on whether the potential path 302, 304 will intersect with the planned path of the autonomous vehicle 200 and on the total distance between the neighboring vehicle 306 and the autonomous vehicle 200. Known traffic rules applying to the intersection can also be used to determine a priority for both the potential paths 302, 304 and the planned path of the autonomous vehicle 200. In this example, the autonomous vehicle 200 can be following a planned path that travels through the roundabout 300 to exit branch 314.

In the example of FIG. 3A, the neighboring vehicle 306 is currently in a position and orientation in respect to the lane structure of the roundabout 300 such that either of the potential paths 302, 304 are equally possible. The neighboring vehicle 306 is also physically close to the autonomous vehicle 200, close enough that if the neighboring vehicle 306 is traveling at a sufficient velocity, the autonomous vehicle 200 would not be able to pull safely in front of the neighboring vehicle 306 should the neighboring vehicle 306 proceed along potential path 304. Given the position and orientation of the neighboring vehicle 306, the autonomous vehicle 200 can assign a priority to potential path 304 equal to the priority of its planned path through the roundabout 300 (to exit branch 314) and assign a priority to potential path 302 below the priority of its planned path through the roundabout 300 since potential path 302 does not intersect with the planned path of the autonomous vehicle 200. Because the planned path of the autonomous vehicle 200 does not have a higher priority than all of the potential paths 302, 304 of the neighboring vehicle 306, the autonomous vehicle 200 will yield, or wait for the neighboring vehicle 306 to proceed further along the roundabout 300.

FIG. 3B shows that the neighboring vehicle 306 has proceeded further along the roundabout 300 in respect to FIG. 3A and is now at an orientation in respect to the exit branch 310 that would make it difficult for the neighboring vehicle 306 to follow potential path 302, that is, a sharp turn would be required to move the neighboring vehicle 306 from its current position to the exit branch 310 along potential path 302. However, the orientation of the neighboring vehicle 306 in respect to the lanes of the roundabout 300 is such potential path 304 is easily followed, allowing the autonomous vehicle 200 to assign a high priority to potential path 304 and a low priority to potential path 302. Given the proximity of the neighboring vehicle 306 to the autonomous vehicle 200, a lower priority can also be assigned to the planned vehicle path of the autonomous vehicle 200 based on traffic rules associated with the roundabout 300. For example, one traffic rule associated with the roundabout 300 can be that vehicles within the roundabout have a right of way in respect to vehicles entering the roundabout 300. Because the planned path of the autonomous vehicle 200 has a lower priority than at least potential path 304 of the neighboring vehicle 306, the autonomous vehicle 200 will wait for the neighboring vehicle 306 to proceed through the roundabout 300.

FIG. 3C shows an alternative position for the neighboring vehicle 306 than the position shown in FIG. 3B. In this example, the neighboring vehicle 306 has proceeded further along the roundabout 300 and is now at an orientation in respect to the potential path 304 that would make it difficult for the neighboring vehicle 306 to follow the potential path 304, that is, a sharp turn would be required to move the neighboring vehicle 306 from its current position to remain within the roundabout 300 along potential path 304. However, the orientation of the neighboring vehicle 306 is such potential path 302 is easily followed, allowing the autonomous vehicle 200 to assign a low priority to both potential paths 302, 304. The low priority for potential path 302 is based on potential path 302 not intersecting the planned path for the autonomous vehicle 200. The planned path for the autonomous vehicle 200 can be assigned a mid-level priority based on traffic rules associated with the roundabout 300. Because the planned path of the autonomous vehicle 200 has a higher priority than both potential paths 302, 304 of the neighboring vehicle 306, the autonomous vehicle 200 can pull into the roundabout 300 without waiting for the neighboring vehicle 306 to exit the roundabout 300.

FIG. 4 shows a t-shaped intersection 400 including a plurality of potential paths 402, 404 for another neighboring vehicle 406 proximate to the autonomous vehicle 200 of FIG. 2. Before determining its priority to enter the intersection 400, the autonomous vehicle 200 can be configured to identify the intersection 400, identify the neighboring vehicle 406, and identify all potential paths 402, 404 for the neighboring vehicle 406 through the intersection 400. Next, the priority for each of the potential paths 402, 404 and the planned path of the autonomous vehicle 200 can be determined. In this example, the autonomous vehicle 200 is waiting at a stop sign 408 to enter the intersection 400, and the neighboring vehicle 406 is traveling toward the intersection 400 with two potential paths 402, 404.

Potential path 404 would turn the neighboring vehicle 406 right at the intersection 400 before the autonomous vehicle 200 and would hence not cross any possible planned paths for the autonomous vehicle 200. Thus, without the need to determine distance, speed, deceleration, or orientation associated with the neighboring vehicle 406, the potential path 404 can be assigned a lower priority than any possible planned path for the autonomous vehicle 200. However, the potential path 402 would take the neighboring vehicle 406 straight through the intersection 400 along its current trajectory and would cross all possible planned paths for the autonomous vehicle 200.

For example, if the planned path for the autonomous vehicle has the vehicle turning right at the stop sign 408, the planned path and the potential path 402 will intersect. In its current position and orientation to the road, the neighboring vehicle 406 is physically able to follow the potential path 402. The neighboring vehicle 406 is also close in distance to the autonomous vehicle 200. All of these factors would favor assigning a higher priority to the potential path 402 than any planned path of the autonomous vehicle 200. However, if the neighboring vehicle 406 were to be recognized as decelerating, with a decreasing vehicle speed, the priority of the potential path 402 could be lowered below any planned path priority, and the autonomous vehicle 200 could enter the intersection 400 without waiting for the neighboring vehicle 406 to traverse the intersection 400.

The lowering of the priority of the potential path 402 because of deceleration and/or low speed is two-fold: one, the neighboring vehicle 406 could be slowing down to turn along the potential path 404 instead of taking the potential path 402; and two, the neighboring vehicle could be traveling at a low speed such that the autonomous vehicle 200 could safely enter the intersection 400 before the neighboring vehicle 406 regardless of which of the potential paths 402, 404 the neighboring vehicle 406 eventually chooses.

Thus, if the neighboring vehicle 406 is traveling at a low speed or decelerating, the autonomous vehicle 200 can enter the intersection (after having made a complete stop at the stop sign 408) based on its planned path priority being higher than the priority for both of the potential paths 402, 404 of the neighboring vehicle 406.

FIG. 5 shows a cross-shaped intersection 500 including a plurality of potential paths 502, 504 for another neighboring vehicle 506 proximate to the autonomous vehicle 200 of FIG. 2. As in previous examples, before determining its own priority to enter the intersection 500, the autonomous vehicle 200 can be configured to identify the intersection 500, identify the neighboring vehicle 506, and identify all potential paths 502, 504 for the neighboring vehicle 506 through the intersection 500. Next, the priority for each of the potential paths 502, 504 and the planned path of the autonomous vehicle 200 can be determined. In this example, the autonomous vehicle 200 is waiting at a red light 508 to turn right at the intersection 500, and the neighboring vehicle 506 is traveling toward the intersection 500 with two potential paths 502, 504 based on its lane position and the green lights 510, 512 present at the intersection 500.

The potential path 502 would take the neighboring vehicle 506 straight through the intersection and would not cross the right-turn-on-red planned path of the autonomous vehicle 200. Thus, without the need to determine distance, speed, deceleration, or orientation associated with the neighboring vehicle 506, the potential path 502 can be assigned a lower priority than the planned path for the autonomous vehicle 200. Alternatively, the potential path 504 includes a trajectory where the neighboring vehicle 506 turns left at the intersection 500 and intersects with the right-turn-on-red planned path for the autonomous vehicle 200. Further, the neighboring vehicle 506 is currently driving toward the intersection 500 facing green lights 510, 512 while the autonomous vehicle 200 is facing a red light 508. Both of these factors would weigh in favor of assigning a higher priority to the potential path 504.

However, if the neighboring vehicle 506 were to be recognized as accelerating, or having a high vehicle speed, the priority of the potential path 504 could be lowered below the priority of the right-turn-on-red planned path, and the autonomous vehicle 200 could enter the intersection 500 without waiting for the neighboring vehicle 506 to enter the intersection 500. Assigning a lower priority to the potential path 504 based on acceleration and/or high speed of the neighboring vehicle 506 is based on the difficulty faced by the neighboring vehicle 506 of making a left turn while accelerating and/or traveling at a high speed. Thus, if the neighboring vehicle 506 is traveling at a high speed or accelerating to move through the intersection 500, the autonomous vehicle 200 can be configured to enter the intersection (after having made a complete stop at the red light 508) based on its planned path priority being higher than the priority for both of the potential paths 502, 504 of the neighboring vehicle 506.

FIG. 6 shows a merging intersection 600 including a plurality of potential paths 602, 604 for another neighboring vehicle 606 proximate to the autonomous vehicle of FIG. 2. As in previous examples, before determining its own priority to enter the intersection 600, the autonomous vehicle 200 can be configured to identify the intersection 600, identify the neighboring vehicle 606, and identify all potential paths 602, 604 for the neighboring vehicle 606 through the intersection 600. Next, the priority for each of the potential paths 602, 604 and the planned path of the autonomous vehicle 200 can be determined. In this example, the autonomous vehicle 200 is traveling in the left lane of a two-lane road, and the neighboring vehicle 606 is entering the two-lane road from a merging lane with two potential paths 602, 604 based on the two available lanes of the two-lane road.

The potential path 602 would put the neighboring vehicle 606 in the right lane of the two lane road and would not cross the planned path of the autonomous vehicle 200 assuming the autonomous vehicle 200 stays in the left lane. Thus, without determining distance, speed, deceleration, or orientation associated with the neighboring vehicle 506, the potential path 602 can be assigned a lower priority than the planned path for the autonomous vehicle 200.

The potential path 604 includes a trajectory where the neighboring vehicle 606 crosses over the right lane while merging at the intersection 600 and enters the left lane of the road, potentially pulling in front of the autonomous vehicle 200. The potential for intersection with the planned path would cause a higher priority to be assigned to the potential path 604. Further, if the neighboring vehicle 606 is recognized at an orientation to the potential path 602 such that following the potential path 602 would be difficult, that is, the neighboring vehicle 606 would need to make a sharp turn to follow the potential path 602, the potential path 604 could be given an even higher priority, and the autonomous vehicle 200 could send a command to one or more of its vehicle systems 118 to slow down the autonomous vehicle 200 and allow the neighboring vehicle 606 to enter the intersection 600.

Figure 7:
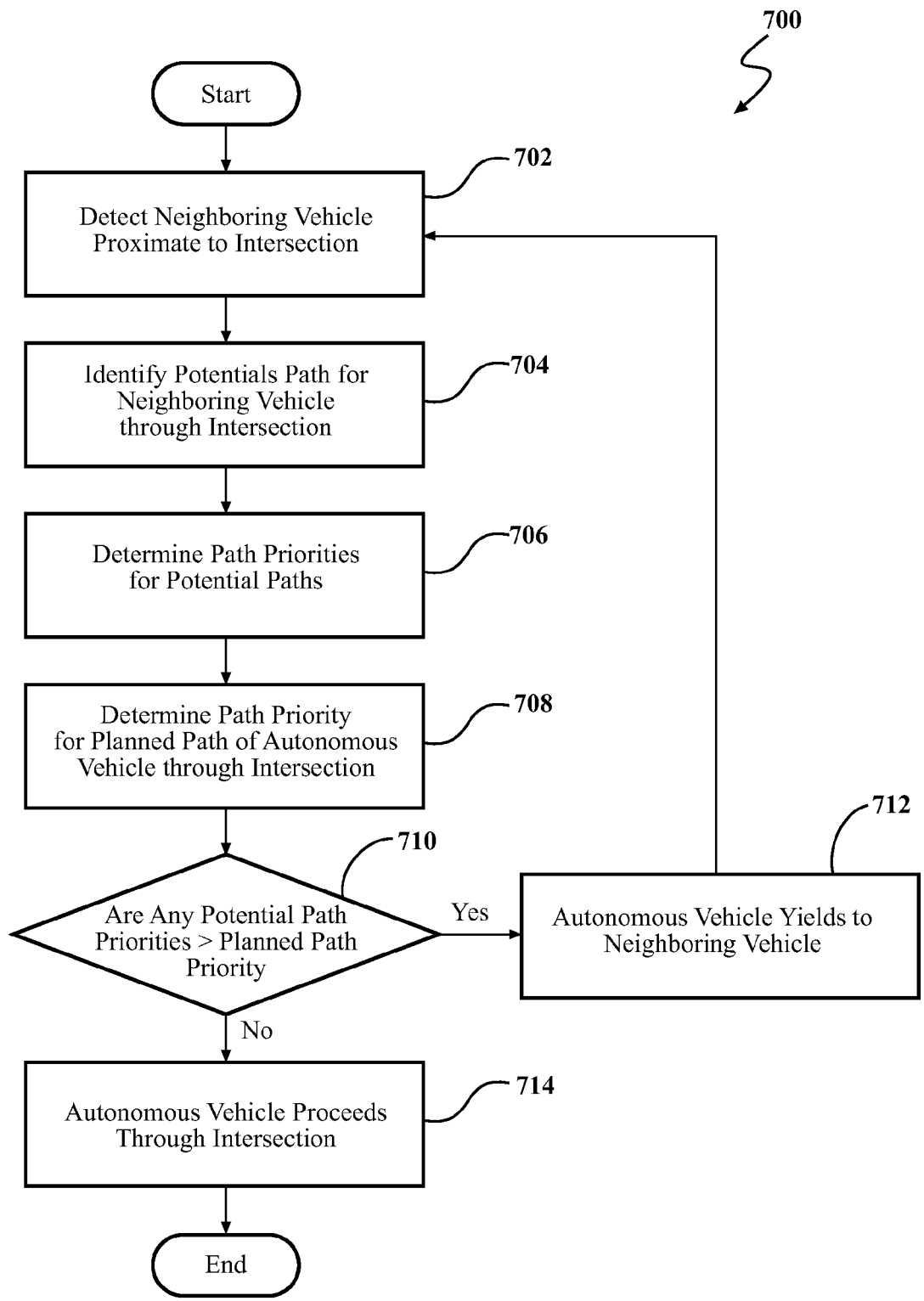
FIG. 7 is a logic flowchart of an intersection priority detection and response process performed by the automated driving system.

FIG. 7 is a logic flowchart of an intersection priority detection and response process 700 performed by the automated driving system. In step 702 of the process 700, the automated driving system can detect a neighboring vehicle, such as the neighboring vehicles 306, 406, 506, or 606, proximate to an intersection, such as the intersections 300, 400, 500, or 600, using the perception system 116. The intersection can be a roundabout, a merging lane, or a junction between at least two roads detected using either the perception system 116 or a map available to the automated driving system of the autonomous vehicle 200. The neighboring vehicle can be detected, for example, within an image or using LIDAR or radar returns captured by the various sensors 202 disposed on the autonomous vehicle 200.

In step 704 of the process 700, the automated driving system can identify two or more potential paths, such as the potential paths 302, 304, 402, 404, 502, 504, 602, 604, for the neighboring vehicle to travel through the intersection. The two or more potential paths can be identified, for example, based on the lane structure of the intersection. The two or more potential paths can also be identified based on traffic rules for the intersection. For example, the neighboring vehicle 506 shown in FIG. 5 has two potential paths 502, 504 given its position in the left lane and the presence of an intersecting road with two lanes at the intersection 500.

In step 706 of the process 700, the automated driving system can determine a path priority for each of the two or more potential paths based on at least one of a position and an orientation of the neighboring vehicle. The position and orientation of the neighboring vehicle can be measured in respect to the autonomous vehicle 200. For example, the distance between the neighboring vehicle and the autonomous vehicle 200 is a position-based measurement. The position and orientation of the neighboring vehicle can also be measured in respect to the two or more potential paths through the intersection for the neighboring vehicle. For example, if the neighboring vehicle is currently traveling in a direction that would make it difficult for the neighboring vehicle to follow one of the potential paths, that potential path can be given a low priority based on the orientation of the neighboring vehicle with respect to that potential path.

The path priorities for each of the two or more potential paths for the neighboring vehicle can also be based on velocity, acceleration, and/or deceleration of the neighboring vehicle. For example, if the neighboring vehicle 406 in FIG. 4 is decelerating, the path priority for the potential path 404 can be increased and the path priority for the potential path 402 can be decreased since it is more likely that the neighboring vehicle 406 will be turning right. A potential path can also be given a low path priority, if, for example, the potential path does not intersect with a planned path for the autonomous vehicle 200. Finally, the path priority for a potential path can be based on one or more traffic rules for the intersection. For example, the path priority of the potential path 604 for the neighboring vehicle 606 in FIG. 6 would generally be lower than the priority for the planned path of the autonomous vehicle 200 since merging traffic is meant to yield to traffic already present on a road.

In step 708 of the process 700, the automated driving system can determine a path priority for the planned path of the autonomous vehicle 200 through the intersection. In this case, the planned path is already known to the autonomous vehicle 200, so the path priority can be based on one or more traffic rules for the intersection when comparing the path priority of the planned path to the path priorities of the potential paths of the neighboring vehicle.

In decision block 710, the automated driving system can determine whether the path priority of at least one of the potential paths for the neighboring vehicle is higher than the path priority of the planned path of the autonomous vehicle 200. If any of the path priorities for any of the potential paths are higher than the path priority for the planned path, the process 700 continues to step 712, and the automated driving system can send a command to one or more of the vehicle systems 118 of the autonomous vehicle 200 to allow the neighboring vehicle to proceed through the intersection before the autonomous vehicle 200. After step 712, the process 700 returns to step 702, and the automated driving system again detects one or more neighboring vehicles at the intersection.

If all of the path priorities of all of the potentials paths for the neighboring vehicle are lower than the path priority of the planned path, the process 700 can continue to step 714, and the automated driving system can send a command to one or more of the vehicle systems 118 to drive the autonomous vehicle 200 through the intersection before the neighboring vehicle. After step 714, the process 700 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
    a perception system disposed on an autonomous vehicle; and
    a computing device in communication with the perception system, the computing device being disposed on an autonomous vehicle, the computing device comprising:
        one or more processors for controlling operations of the computing device; and
        a memory for storing data and program instructions used by the one or more processors, wherein the one or more processors are configured to execute instructions stored in the memory to:
            detect, using the perception system, a neighboring vehicle proximate to an intersection;
            identify two or more potential paths through the intersection for the detected neighboring vehicle;
            determine a path priority for each of the identified two or more potential paths for the detected neighboring vehicle based on at least one of a position and an orientation of the detected neighboring vehicle, the path priority being independent of information sent by the detected neighboring vehicle;
            determine a path priority for a planned path through the intersection for the autonomous vehicle, the planned path through the intersection for the autonomous vehicle conflicting with at least one of the identified two or more potential paths through the intersection for the detected neighboring vehicle; and
            if the determined path priority of at least one of the identified two or more potential paths for the detected neighboring vehicle is higher than the determined path priority of the planned path for the autonomous vehicle, send a command to one or more vehicle systems of the autonomous vehicle, the command being to allow the neighboring vehicle to proceed through the intersection before the autonomous vehicle.

2. The automated driving system of claim 1, wherein the intersection is one of a roundabout, a merging lane, and a junction of at least two roads.

3. The automated driving system of claim 1, wherein the identified two or more potential paths through the intersection for the detected neighboring vehicle are identified based on at least one of a lane structure of the intersection and one or more traffic rules for the intersection.

4. The automated driving system of claim 1, wherein the position and the orientation of the detected neighboring vehicle is in respect to the autonomous vehicle.

5. The automated driving system of claim 1, wherein the position and the orientation of the detected neighboring vehicle is in respect to the identified two or more potential paths through the intersection for the detected neighboring vehicle.

6. The automated driving system of claim 1, wherein determining the path priority for each of the identified two or more potential paths through the intersection for the detected neighboring vehicle are further based on at least one of a velocity, an acceleration, and a deceleration of the detected neighboring vehicle.

7. The automated driving system of claim 1, wherein determining the path priority for the planned path through the intersection for the autonomous vehicle and the path priority for each of the identified two or more potential paths through the intersection for the detected neighboring vehicle are further based on one or more traffic rules for the intersection.

8. The automated driving system of claim 1, wherein the one or more processors are further configured to:
    if the determined path priority of all of the identified two or more potential paths for the detected neighboring vehicle are lower than the determined path priority of the planned path for the autonomous vehicle, send a command to one or more vehicle systems of the autonomous vehicle, the command being to drive the autonomous vehicle through the intersection before the detected neighboring vehicle.

9. A computer-implemented method of automated driving, comprising:
   detecting, using a perception system disposed on an autonomous vehicle, a neighboring vehicle proximate to an intersection;
   identifying, using a computing device being disposed on an autonomous vehicle, two or more potential paths through the intersection for the detected neighboring vehicle;
   determining a path priority for each of the identified two or more potential paths for the detected neighboring vehicle based on at least one of a position and an orientation of the detected neighboring vehicle, the path priority being independent of information sent by the detected neighboring vehicle;
   determining a path priority for a planned path through the intersection for the autonomous vehicle, the planned path through the intersection for the autonomous vehicle conflicting with at least one of the identified two or more potential paths through the intersection for the detected neighboring vehicle; and
   if the determined path priority of at least one of the identified two or more potential paths for the detected neighboring vehicle is higher than the determined path priority of the planned path for the autonomous vehicle, sending a command to one or more vehicle systems of the autonomous vehicle, the command being to allow the neighboring vehicle to proceed through the intersection before the autonomous vehicle.

10. The method of claim 9, wherein the position and the orientation of the detected neighboring vehicle is in respect to the autonomous vehicle.

11. The method of claim 9, wherein the position and the orientation of the detected neighboring vehicle is in respect to the identified two or more potential paths through the intersection for the detected neighboring vehicle.

12. The method of claim 9, wherein determining the path priority for each of the identified two or more potential paths through the intersection for the detected neighboring vehicle are further based on at least one of a velocity and an acceleration and a deceleration of the detected neighboring vehicle.

13. The method of claim 9, wherein determining the path priority for the planned path through the intersection for the autonomous vehicle and the path priority for each of the identified two or more potential paths through the intersection for the detected neighboring vehicle are further based on one or more traffic rules for the intersection.

14. The method of claim 9, further comprising:
   if the determined path priority of all of the identified two or more potential paths for the detected neighboring vehicle are lower than the determined path priority of the planned path for the autonomous vehicle, sending a command to one or more vehicle systems of the autonomous vehicle, the command being to drive the autonomous vehicle through the intersection before the detected neighboring vehicle.

15. A computing device, comprising:
   one or more processors for controlling operations of the computing device, the one or more processors being disposed on an autonomous vehicle; and
   a memory for storing data and program instructions used by the one or more processors, wherein the one or more processors are configured to execute instructions stored in the memory to:
      detect, using a perception system disposed on an autonomous vehicle, a neighboring vehicle proximate to an intersection;
      determine a path priority for each of two or more potential paths through the intersection for the neighboring vehicle, the path priority being independent of information sent by the detected neighboring vehicle;
      determine a path priority for a planned path through the intersection for the autonomous vehicle, the planned path through the intersection for the autonomous vehicle conflicting with at least one of the identified two or more potential paths through the intersection for the detected neighboring vehicle; and
      if the determined path priority of at least one of the two or more potential paths for the detected neighboring vehicle is higher than the determined path priority of the planned path for the autonomous vehicle, send a command to one or more vehicle systems of the autonomous vehicle, the command being to allow the neighboring vehicle to proceed through the intersection before the autonomous vehicle.

16. The computing device of claim 15, wherein the intersection is one of a roundabout, a merging lane, and a junction of at least two roads.

17. The computing device of claim 15, wherein determining the path priority for each of the two or more potential paths through the intersection for the detected neighboring vehicle are based on at least one of a position, an orientation, a velocity, an acceleration, and a deceleration of the detected neighboring vehicle.

18. The computing device of claim 17, wherein the position and the orientation of the detected neighboring vehicle is in respect to the two or more potential paths through the intersection for the detected neighboring vehicle.

19. The computing device of claim 17, wherein the position and the orientation of the detected neighboring vehicle is in respect to the autonomous vehicle.

20. The computing device of claim 15, wherein the one or more processors are further configured to:
   if the determined path priority of all of the two or more potential paths for the detected neighboring vehicle are lower than the determined path priority of the planned path for the autonomous vehicle, send a command to one or more vehicle systems of the autonomous vehicle, the command being to drive the autonomous vehicle through the intersection before the detected neighboring vehicle.

* * * * *